(12) United States Patent
Reuzel et al.

(10) Patent No.: US 9,356,938 B2
(45) Date of Patent: May 31, 2016

(54) METHOD, DEVICE, SYSTEM, TOKEN CREATING AUTHORIZED DOMAINS

(75) Inventors: Johan Gerhard Herman Reuzel, Eindhoven (NL); Robert Paul Koster, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 904 days.

(21) Appl. No.: 11/815,112

(22) PCT Filed: Jan. 27, 2006

(86) PCT No.: PCT/IB2006/050303
§ 371 (c)(1),
(2), (4) Date: Jul. 31, 2007

(87) PCT Pub. No.: WO2006/082549
PCT Pub. Date: Aug. 10, 2006

(65) Prior Publication Data
US 2010/0043060 A1    Feb. 18, 2010

(30) Foreign Application Priority Data
Feb. 4, 2005   (EP) .................................... 05100797

(51) Int. Cl.
*G06F 7/04*        (2006.01)
*H04L 29/06*       (2006.01)
*G06F 21/10*       (2013.01)

(52) U.S. Cl.
CPC .............. *H04L 63/102* (2013.01); *G06F 21/10* (2013.01); *G06F 2221/0717* (2013.01); *H04L 63/08* (2013.01); *H04L 2463/101* (2013.01)

(58) Field of Classification Search
CPC ............ G06F 21/10; G06F 2221/0717; H04L 2463/101; H04L 63/08; H04L 63/102
USPC .......................................................... 726/4
See application file for complete search history.

(56) References Cited

U.S. PATENT DOCUMENTS

| | | | |
|---|---|---|---|
| 6,928,469 B1 | 8/2005 | Duursma et al. | |
| 7,478,078 B2 * | 1/2009 | Lunt et al. | |
| 7,856,473 B2 | 12/2010 | Horikiri et al. | |

(Continued)

FOREIGN PATENT DOCUMENTS

| | | |
|---|---|---|
| GB | 2403308 | 12/2004 |
| JP | H0319067 A | 1/1991 |

(Continued)

OTHER PUBLICATIONS

Van den Heuvel et al., "Secure Content Management in Authorised Domains", International Broadcasting Convention, Sep. 15, 2002, Philips Research, The Netherlands.

(Continued)

*Primary Examiner* — Ashok Patel
*Assistant Examiner* — Gary Garcia (57) ABSTRACT

This invention relates to a method (100) for creating, on a device (200), an authorized domain (102) for sharing a (103) of a content item (104) between a first person (105) and a second person (106). The method (100) alleviates the hassle of having end-users managing authorized domains. If the first person is bound (107) to the right (103), and the device is bound (108) to the first person (105), the device (200) grants (110) the second person (106) the right (103) in response to the device (200) associating (109) to the second person (106).

9 Claims, 8 Drawing Sheets

(56) References Cited

U.S. PATENT DOCUMENTS

| | | | |
|---|---|---|---|
| 2002/0069361 A1* | 6/2002 | Watanabe et al. | 713/185 |
| 2002/0124249 A1 | 9/2002 | Shintani et al. | |
| 2002/0126762 A1 | 9/2002 | Tanaka | |
| 2003/0005135 A1* | 1/2003 | Inoue et al. | 709/229 |
| 2003/0182100 A1* | 9/2003 | Plastina et al. | 704/1 |
| 2003/0212804 A1 | 11/2003 | Hashemi | |
| 2004/0054923 A1* | 3/2004 | Seago et al. | 713/201 |
| 2004/0162982 A1 | 8/2004 | Komai | |
| 2004/0246950 A1* | 12/2004 | Parker | H04L 29/12018 370/356 |
| 2005/0066219 A1* | 3/2005 | Hoffman | G06F 21/6218 714/4.1 |
| 2005/0071669 A1* | 3/2005 | Medvinsky et al. | 713/200 |
| 2005/0086532 A1* | 4/2005 | Lotspiech et al. | 713/201 |
| 2005/0102513 A1* | 5/2005 | Alve | 713/168 |
| 2005/0114333 A1* | 5/2005 | Nagano et al. | 707/8 |
| 2005/0168323 A1* | 8/2005 | Lenoir et al. | 340/5.74 |
| 2005/0192966 A1* | 9/2005 | Hilbert | G06F 17/30067 |
| 2006/0021065 A1 | 1/2006 | Kamperman et al. | |
| 2006/0075230 A1* | 4/2006 | Baird et al. | 713/168 |

FOREIGN PATENT DOCUMENTS

| | | |
|---|---|---|
| JP | H0981516 A | 3/1997 |
| JP | H10211191 A | 8/1997 |
| JP | H10143527 A | 5/1998 |
| JP | 2002262254 A | 9/2002 |
| JP | 2002533830 A | 10/2002 |
| JP | 2003186559 A | 7/2003 |
| JP | 2003223421 A | 8/2003 |
| JP | 2003316737 A | 11/2003 |
| JP | 2004171526 A | 6/2004 |
| JP | 2004295846 A | 10/2004 |
| JP | 2006504176 A | 2/2006 |
| WO | 0039678 A1 | 7/2000 |
| WO | 0197052 A1 | 12/2001 |
| WO | 03058877 A1 | 7/2003 |
| WO | WO03058948 | 7/2003 |
| WO | WO03098931 | 11/2003 |
| WO | WO2004038568 | 5/2004 |
| WO | WO2005010879 | 2/2005 |
| WO | 2005066701 A1 | 7/2005 |
| WO | 2005093544 A1 | 10/2005 |
| WO | WO2005093544 | 10/2005 |

OTHER PUBLICATIONS

Brands et al, "Distance-Bounding Protocols", CWI, Amsterdam, Undated, pp. 1-16.

* cited by examiner

Device D1 can access C1 to C6; Device D2 can only access C4 to C6

METHOD, DEVICE, SYSTEM, TOKEN CREATING AUTHORIZED DOMAINS

BACKGROUND

The invention relates to a method for creating an authorized domain.

The invention further relates to a device, and a token for creating an authorized domain, and to a computer readable medium having stored thereon instructions for causing one or more processing units to execute the method according to the invention.

The invention further relates to a created authorized domain and to a digital rights management system for enforcing a created authorized domain.

In recent years, the amount of content protection systems is growing in a rapid pace. Some of these systems only protect the content against illegal copying, while others are also prohibiting the user to get access to the content. The first category is called Copy Protection (CP) systems. CP systems have traditionally been the main focus for consumer electronics (CE) devices, as this type of content protection is thought to be cheaply implemented and does not need bi-directional interaction with the content provider. Some examples are the Content Scrambling System (CSS), the protection system of DVD ROM discs and DTCP (a protection system for IEEE 1394 connections).

The second category is known under several names. In the broadcast world, systems of this category are generally known as conditional access (CA) systems, while in the Internet world they are generally known as digital rights management (digital rights management) systems.

A home network can be defined as a set of devices that are interconnected using some kind of network technology (e.g. Ethernet, IEEE 1394, BlueTooth, 802.11b, 802.11g, etc.). Although network technology allows the different devices to communicate, this is not enough to allow devices to interoperate. To be able to do this, devices need to be able to discover and address the functions present in the other devices in the network. Such interoperability is provided by home networking middleware. Examples of home networking middleware are Jini, HAVi, UPnP, AVC.

The concept of authorized domains aims at finding a solution to both serve the interests of the content owners (that want protection of their copyrights) and the content consumers (that want unrestricted use of the content). The basic principle is to have a controlled network environment in which content can be used relatively freely as long as it does not cross the border of the authorized domain. Typically, authorized domains are centered around the home environment, also referred to as home networks. Of course, other scenarios are also possible. A user could for example take a portable device for audio and/or video with a limited amount of content with him on a trip, and use it in his hotel room to access or download additional content stored on his personal audio and/or video system at home. Even though the portable device is outside the home network, it is a part of the user's authorized domain. In this way, an authorized domain is a system that allows access to content by devices in the domain, but not by any others.

For a more extensive introduction to the use of an authorized domain, etc., see S. A. F. A. van den Heuvel, W. Jonker, F. L. A. J. Kamperman, P. J. Lenoir, Secure Content Management in authorized domains, Philips Research, The Netherlands, IBC 2002 conference publication, pages-474, held at 12-16 Sep. 2002.

Various proposals exist that implement the concept of authorized domains to some extent.

One type of previous solutions include device based authorized domains. Examples of such systems are SmartRight (Thomson Multimedia), xCP, and NetDRM (Matshushita). A further example of a device based authorized domain is e.g. given in international patent application WO 03/098931 by the same applicant.

In typical device based authorized domains, the domain is formed by a specific set of devices and content. Only the specific set of devices of the domain is allowed to access, use, etc. the content of that domain. There is not made any distinction of the various users of the specific set of devices.

A drawback of device based authorized domain systems is that they typically do not provide the typical flexibility that a user wants or need, since users are restricted to a particular and limited set of devices. In this way, a user is not allowed to exercise the rights that the user has obtained anytime and anywhere he chooses. For example, if a user is visiting a friend's house he is not able to access his legally purchased content on the friend's devices as these devices would not typically be part of the particular and limited set of devices forming the domain comprising the user's content.

Another type of previous solutions is person based authorized domains where the domain is based on persons instead of devices, as was the case for device based authorized domains. An example of such a system is e.g. described in international patent application serial number IB2003/004538 by the same applicant, in which content is coupled to persons, which then are grouped into a domain.

In a typical person based authorized domain access to content bound to that authorized domain is allowed by only a specific and limited set of users, but e.g. using any compliant device. Person based authorized domains typically offer easier domain management compared to device based authorized domains.

However, person based systems require person identification which is not always convenient or preferred by users. Further, a visitor to your home may want to access your content. As he does not have a person id device for that domain, it is not possible for him to access content. It would be preferred if devices in the home belonging to the domain could enable access of domain content by the visitor.

Therefore, there is a need for a hybrid person and device based authorized domain having the individual advantages of each system. Such a hybrid person and device based authorized domain is proposed in European patent application serial number 03102281.7 by the same applicant. In that application, an authorized domain is proposed which combines two different approaches to define an authorized domain. The connecting part between the device and the person approach is a Domain Identifier. The devices are preferably grouped together via a domain devices certificate (DDC), while the persons preferably are separately grouped via a domain users certificate (DUC) and where content is directly or indirectly linked to a person.

However, this authorized domain has the disadvantage that when content is imported into the domain (an action typically done on a device), e.g. from a delivery digital rights management and/or CA system, it is not directly clear to which person the content has to be attributed. In other words, at the moment of import, the system needs additional information of whom it must link the content to.

Therefore, there is a need for a simple method of creating an authorized domain where the additional information required upon importing content is easily and/or directly obtainable. This is achieved with the authorized domain proposed in European patent application serial number 04101256 by the same applicant. In that application a method of generating an authorized domain is proposed wherein a domain identifier uniquely identifying the authorized domain is selected, wherein a user is bound to the domain identifier, wherein a content item is bound to the user, and wherein a device is bound to the user. Rather than binding each of the content items, devices and users to an authorized domain, only users are bound to an authorized domain, and content items and devices are bound in turn to users.

A drawback of the above prior art method is that the authorized domain is managed explicitly, typically by the end-user. This involves adding users, devices, and content items to the authorized domain, requiring considerable effort.

To address the above issues, in particular the managing of the authorized domain, it is an object of the invention to provide a method for creating an authorized domain that does not require explicit management of the authorized domain as such.

SUMMARY

This object, among others, is achieved with a method for creating, on a device, an authorized domain for sharing a right of a content item between a first person and a second person, the first person being bound to the right, the device being bound to the first person, the method comprising:

associating the device to the second person; and granting the second person the right in response to the associating.

The method thereby creates, on the device, the authorized domain for sharing the right of the content item between the first and the second person, because the second person is granted the right that the first person was bound to.

The device may comprise any piece of equipment in use for authorized domain in the prior art, like an audio and/or video player, a set top box, a portable for playing mp3 files, a personal computer, a broadcasting computer that streams real-time content items and so on.

The authorized domain is created on the device, as is evident from the second person being granted to exercise the right of the first person. The authorized domain exists on the device. For the authorized domain to be secure, the device needs to be a compliant or trusted device as is known in the art. Only a device that enforces the authorized domain on the device is able to exercise the right, e.g. to decrypt and to render the content item. The device may have to prove its trustworthiness and compliancy to receive licenses or keys. Many protocols are known for trust establishment and device authentication. In order to limit the size of the authorized domain effectively, the device itself may need to be restricted in size, for example disallowing distribution of device functionality over a network.

The right may for example be a right to access or to render the content item. Further examples include a right to receive, to transmit, to open, to close, to decrypt, to encrypt, to decode, to encode, to buffer, to store, to modify, to process, to stream, to watermark, or to delete the content item. The right may pertain to a single content item, but it may additionally pertain to another content item, or to a set of content items.

The content item may comprise real-time audio and/or video material, or still other material, like multi-media entertainment, a piece of artwork, a game and so on. The content item may be in a format like a file on a storage medium like an optical disk, a magnetic disk, solid-state memory, a read only memory, a USB key, a smart-card, and so on. The file may comprise instructions to be executed or interpreted on a central processor, like assembly code, compiler output, bytecode, and so on.

It is noted that the term person is intended to cover both a human being or alternatively a token that represents the person, or a combination thereof. The token may e.g. be an identification device, a smartcard, a mobile phone, an rfid tag, and so on. Alternatively, the token may be used for e.g. identifying or authenticating the person, enhancing convenience of the method for the user, because the token may e.g. provide credentials required for the authenticating of the person. An example is that the device binds the first person, because the first person puts a smartcard on top of the device, and this triggers communication between the smartcard and the device, e.g. by near field communication, such that credentials of the first person stored in the card are provided to the device.

The above notion of the term person holds for both the first person and for the second person.

The device is able to bind to the first person, after or as part of, e.g. a log-on procedure completed or after executing a protocol exchanging credentials.

The device is able to associate to the second person, e.g. by the second person identifying at the device, or by the second person pushing a button on the device.

The first person being bound to the right means that the first person is already entitled to exercise the right of the content item on the device, before the method is applied. This may have been achieved with the prior step of binding the first person to the right. Such step may be accomplished by e.g. the first person buying or hiring the right, or by the first person buying a token like a smart-card.

The device being bound to the first person means that the device is already bound to the first person, before the method is applied. This may have been achieved with the prior step of the first person logging onto the device or identifying or authenticating at the device.

In a first step of the method, the device is associated to the second person. This may be achieved in several ways. In a first way, the device associates to the second person in response to the second person pushing a button on the device. In a second way, the second person selects a menu option on the device. In a third way, the second person logs on to the device. In a fourth way, the device detects the second person being close to the device, e.g. by the person carrying a transponder or RFID tag. Still further ways are possible to trigger the device associating the second person. Associating to the second person may be less secure than binding to the first person. Alternatively, the device associating to the second person may comprise the device binding to the second person. The associating may thus be achieved by binding the second person. Advantages of such associating include that the same procedures used for binding a person may be used for associating a person, and that the associating may be more secure.

In a second step of the method, the second person is granted the right in response to the associating. As an effect of the granting, the second person is added to the authorized domain. Before execution of the method, the second person may not have been entitled to exercise the right, but after execution of the method, the second person is entitled to exercise the right on the device. The granting does not require the right to be transferred to the second person. The granting has the effect that the second person may use or exercise the right on the device.

The invention is at least to some extent based on the observation that the device may create an authorized domain for the first person on the device, in response to the device binding to the first person, and that the device may add a further person to the authorized domain, in response to the device associating to the further person. One may consider the authorized domain to be created in response to the device binding the first person. The authorized domain becomes only manifest with the device associating to the second person, because there is little to share when the device bound to the first person only.

Further advantages of the method in accordance with the invention include that the method is easy to be understood, because the method relies only on concepts familiar to the end-user. Further, there is no separate need to manage devices and content before actually using these devices and content, as is typically required with prior art solutions. Further, the concept of an authorized domain may appear artificial to the end-user, as it does not map to anything that the user naturally knows already. Further the method saves on necessary management actions, and there is no need for persistent storage of authorized domain configurations, such that puzzling questions like where to store this information and how to distribute this information do not need to be answered. Further, the method alleviates the need for an Internet connection, because the device may stand alone. Also, the method enables a relatively easy definition of rules for restricting the authorized domain, and the method naturally distinguishes between household members and other people that do not share devices.

Advantageously, the method has the features of claim 2. By only conditionally granting the right, the size of the authorized domain may effectively be limited in dependence of the condition determined. This has the advantage that the granting may be made dependent on several parameters, such that the method for creating the authorized domain matches better with business needs that strike a balance between the interests of the persons and the content industry. It is noted that also without the feature of claim 2, the authorized domain is limited in size because claim 1 specifies both persons to have access to the device.

The determining may typically be performed by evaluating a Boolean expression with software. The condition holds if evaluating the expression yields the value true. The condition may be composed of several criteria.

Advantageously, the method has the features of claim 3. By establishing a time interval, and determining in dependence of the time interval, the granting becomes also dependent on temporal or dynamic aspects. The condition may depend explicitly on time, e.g. in that the grating is only allowed on a particular calendar day, or only two hours after binding the first person, and so on. This enables e.g. the automatic expiry of the binding from the device to the first person, including advantages such as that forgotten bindings are removed from the system, and that the system is fail-safe for breaking trust over time.

Advantageously, the method has the features of claim 4. Keeping the history of relevant events in the device enables the condition, and thus the granting, to be subject to various constraints. This allows the authorized domain to better match particular business cases or usage scenarios. Examples include the restriction that the right may only be granted once to the second person, and the restriction to a maximum number of grants based on the binding from the device to the first person, and the restriction that the right may only be granted to at most four different persons in total for each day.

Advantageously, the method has the features of claim 5. The method may also comprise exercising the right, because this may simplify enforcing the size of the authorized domain, by granting and exercising the right in one go. This may for example save on system implementation complexity because (1) creation of the authorized domain may be triggered by end-user behavior e.g. regular operations on the content item, (2) this is relatively easy to implement and (3) may result in an easy conceptual view of the method and the system for the end-user. Additionally, this may for example save on context switches if a single processor runs a single software routine, rather than distributing the granting and the exercising. The exercising may entail storing, accessing, retrieving, decrypting, processing, and rendering the content item either at the device or at a further device.

Advantageously, the method has the features of claim 6. If the associating comprises authenticating the second person for being bound by the device, unauthenticated use of the right of the content item is prevented. This may enhance the security of the system and improve the tightness of the authorized domain.

Advantageously, the method has the features of claim 7. Authenticating the second person prevents that the right is granted to an impersonation of the second person. Logging on has the advantage that an existing and tight infrastructure for users logging onto the device may be re-used. The identity and/or the password provided may be dedicated to the device. Using a smartcard has the advantage that it is cheap and tamper-proof hardware and that it may provide convenience for the user. Further, a smartcard may store the history of claim 4. Using a token provides for intuitive use and a token may be easily sold and carried with a person. Using Near Field Communication may provide for secure communication over a short distance at little costs, and add convenience. Providing a biometry offers the convenience that the person cannot forget it or leave it, because it is intrinsically carried around with the person, such that the biometry is always available for the person. Providing a proof of the person being physically in the proximity of the device may alleviate the need for an explicit interaction with the device by the person, because approaching the device may suffice for associating and/or binding.

Advantageously, the method has the features of claim 8. Evaluating at least one criterion further enhances flexibility and versatility in matching the method to business needs. The criterion that the device is associated or bound to a further person, enables e.g. a scheme wherein only the first and the second person may share the right at the device. The criterion that the device is associated or bound to a number of further persons exceeds a threshold, enables e.g. a scheme wherein at most the number of further persons may share the right at the device. The criterion that a further device is bound to the first person, enables e.g. a scheme wherein the first person may not be bound to the further device for sharing the right at the device. The criterion that a further device is associated to the second person, enables e.g. a scheme wherein the second person may not be associated to the further device for sharing the right at the device. The criterion that a number of further devices are bound to the first person and the number exceeds a threshold, enables e.g. a scheme wherein the first person may at most be bound to the number of further devices for sharing the right at the device. The criterion that a number of further devices are associated to the second person and the number exceeds a threshold, enables e.g. a scheme wherein the second person may at most be associated to the number of further devices for sharing the right at the device. The criterion that the device bound the first person at an instant outside a time interval, enables e.g. a scheme like a happy hour, wherein binding within the time interval enables sharing the right. The criterion that the time interval between the determining and the instant that the device bound the first person, exceeds a threshold, enables e.g. an expiry scheme wherein the binding expires over time after the threshold has lapsed. The criterion that the time interval between the determining and the instant that the device last granted the right, is below a threshold, enables e.g. a scheme wherein the rate of the grants over time is maximized at a frequency reciprocal to the threshold. The criterion that the number of instants of the granting in a time interval exceeds a threshold, enables e.g. time windowing schemes. The criterion that the number of instants of the associating in a time interval exceeds a threshold may serve to maximize the rate of granting over time. Each of these criteria offers the advantage that it increases the versatility of the method.

Determining the condition not to hold if at least one of the criteria evaluated are met, has the advantage of an opt-out scheme, wherein additional criteria may be added at will without changing criteria already present, and without jeopardizing the size limitations.

Advantageously, the method has the features of claim 9. Revoking a previously granted further right is a simple way to keep the number of concurrent grants on the device unchanged, while allowing for different persons to get granted the right over time. This may be used for limiting the size of the authorized domain. Similarly as with the granting, the revoking does not necessarily require a transfer of the right. Rather, the device may be arranged to disable the second person to use or to exercise the right after the revoking. The further content item may be the content item, providing for a limit of concurrent grants of the content item only. The further person may be the first person. The further person may be the person with the oldest grant, or with the youngest grant, and so on. This may lead to a scheme wherein e.g. the person that 'possessed' the grant longest is the first to be revoked.

Basically, the step of granting of the method of the invention allows the authorized domain to grow due to the device being bound to the first person. Analogously, the authorized domain may shrink due to the device being unbound to the first person. This may be worded as: the method further comprising revoking a right previously granted to the second person, in response to the device unbinding the first person. If for example the first person explicitly loggs off the device, the second person is no longer allowed to use the right anymore. The authorized domain may shrink as well due to the device not longer being associated to the second person. This may be worded as: the method further comprising revoking a right previously granted to the second person, in response to the device disassociating the second person. If for example the second person explicitly loggs off the device, the second person is no longer allowed to use the right anymore. These measures serve to enforce the size limitations imposed on the authorized domain as required.

There are several ways to loosen the requirements on the sequence of binding, unbinding, associating and disassociating, while maintaining the primary functionality of an authorized domain.

In a first way, the method may also comprise unbinding the first person only in response to expiry of a timer. The timer may be set to expire at a predetermined instant, or after a time period has lapsed since the device bound the first person. This allows the first person to e.g. be logged off from the device for a time period in which the second person may still be granted the right in response to the associating.

Similarly, but in a second way, the method may comprise guarding a grace period in which the second person is still granted the right after the first person unbinds from the device. This allows the first person to unbind or log-off from the device while the second person may continue to be granted the right.

In a third way, the method may also comprise disassociating the second person after a time interval has lapsed. This ensures that the second person regularly associates again. This is particularly effective if the method also comprises revoking the grant in response to the disassociating.

In a fourth way, the method may also comprise revoking the grant after a time interval has lapsed. This provides for automatic expiry of the grants. Still other ways are possible.

The content item may be encrypted and the right may comprise access to a decryption key for decrypting the content item. The method may therefore also comprise accessing a decryption key and decrypting the content item with the decryption key accessed.

Advantageous embodiments of the device, the system, and the token according to the present invention correspond to the embodiments of the method and have the same advantages for the same reasons.

Further, the invention also relates to a computer readable medium having stored thereon instructions for causing one or more processing units to execute the method according to the present invention.

The invention also relates to an authorized domain that has been generated by the method or by the system according to the present invention.

DETAILED DESCRIPTION OF THE DRAWINGS

These and other aspects of the invention will be apparent from and elucidated with reference to the illustrative embodiments shown in the drawings, in which.

Throughout the figures, same reference numerals indicate similar or corresponding features. Some of the features indicated in the drawings are typically implemented in software, and as such represent software entities, such as software modules or objects.

DETAILED DESCRIPTION OF EMBODIMENTS

In current methods for creating an authorized domain 102, the authorized domain 102 is typically managed by the user.

These methods and the created authorized domain 102 may be hard for a user to understand because they do not directly relate to a real-world concept or object.

Typically, an authorized domain 102 system 400 includes means to limit the size of the authorized domain 102. This may be achieved by either limiting 113 the amount of devices that are part of the domain, or by limiting 113 the number of users part of a certain domain.

In some known systems it is technically difficult to manage information objects that represent the state of the authorized domain 102. Network access to devices located on the internet that contain the state information is often necessary for validating that a user may use the device 200 for rendering a content item 104. For example, Fairplay, the digital rights management solution coupled to Apple iTunes, allows a user to enjoy his content on multiple computers by allowing him to login at three computers at the same time. This login procedure however requires that the user is online connected to the Internet and requires interaction with a backend system 400 on the internet, which may be not desirable and inconvenient to the user, or it may be technically impossible in some cases or not suitable for certain user interfaces.

Other digital rights management systems that do not include the notion of accessing content on multiple machines simply restrict access to one device 200. This violates a number of user-requirements and a scenario like transferring content for personal use to another environment like a car, or at work.

Figure 1:
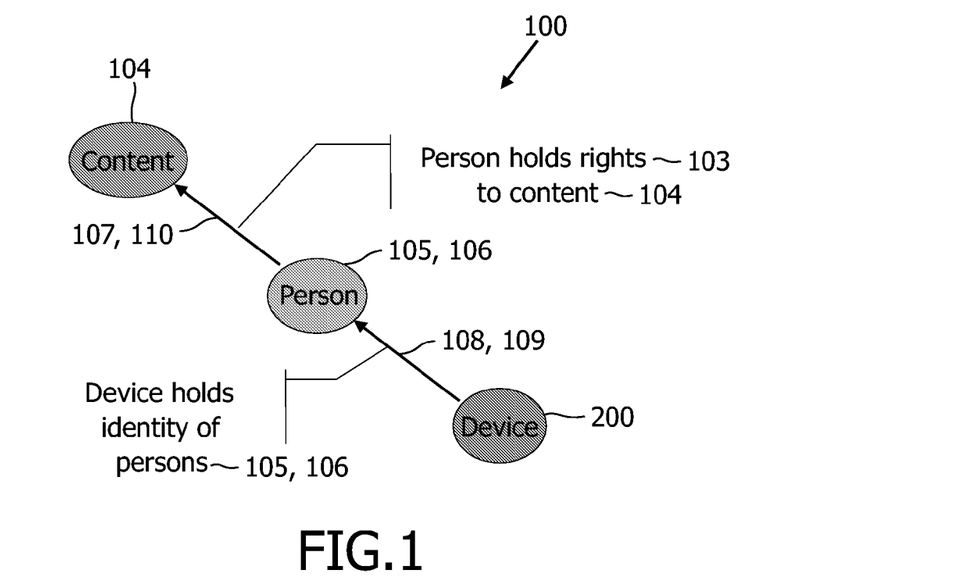
FIG. 1 schematically illustrates the content, the person, and the device 200 with the structural relations.

To address the above issues, the method 100 according to the invention is based on concepts that are known to a user of the authorized domain 102. Using an authorized domain 102 may be simplified if it is handled in terms familiar in the problem domain. Therefore, the method 100 is based on the three concepts illustrated in FIG. 1:
1. a person 105, 106, identifying an individual user.
2. a content item 104 that represents e.g. multi-media content that can be bought, copied, rendered, etc.
3. a device 200, e.g. multi-media or storage capable devices that can perform actions on content like copying, rendering, etc.

It is noted that these concepts are well-known as such and have been applied in authorized domain 102 solutions. With the method 100 of the invention however, the relations between the concepts and their usage differ. The method 100 makes use of two directed relations between the three concepts:
1. there is a relation 107, 110 from Person 105, 106 to Content 104. A Person holds rights 103 to perform certain actions on Content 104.
2. there is a relation 108, 109 from Device 200 to Person 105, 106. A device 200 holds the identity of (several) persons 105, 106, 120. The identity may be held in any suitable form like a unique identifier, certificates, keys, or user references.

The direction of these relations is of importance. A person 105 binds to content 104 by means of rights 103. There is no direct relation from content 104 to person 105, meaning that a content 104 may be bound 107 to many persons 105. Who has rights 103 to a content item 104 may not be directly seen from the content item 104. In principle one would have to check each person 105 if it has rights 103 to the content 104.

The same reasoning holds for the relation between devices 200 and persons 105, 106. Each device 200 may hold identities of persons 105, 106. There is no direct relation from person 105 to device 200. Each person 105 may register itself at many devices 200. If one would like to know what devices 200 are 'in use' by a person 105, one would have to inspect each device 200 to see if it holds the identity of the person 105.

The relations 107-110 in the system 400 according to the invention are created on the initiative of the user. The user is in control of the relations 107-110.

A relation 107 between a person 105 and a content 104 is e.g. created when the user creates content 104, or when the user buys the rights 103 to access certain content 104. A user may explicitly give up the right 103 to a content item 104. This would result in a removal of the relation 107. For example, in one scenario, a right 103 to a content item 104 may be transferred to another person 120, e.g. as a gift.

A relation 108, 109 between a device 200 and a person is likewise created on the initiative of the user. A device 200 may bind 108 to a person 105. This process is also referred to as log-on in this text. A person (user) may trigger the binding 108 by e.g. identifying at the device 200. During log-on, the device 200 may obtain and hold the identity of the person 105.

The reverse process is referred to as log-off or unbinding. A device 200 may unbind a bound person. A person (user) may trigger the unbinding explicitly, e.g. by an explicit log-off, forcing the device 200 to remove the relation 108 to the person identity.

The device 200 may, similarly to binding 108 the first person 105, associate 109 to the second person 106. The requirements for associating 109 a person 105, 106 may be less strict than those for binding 108 the person 105, 106.

The conditional use of a content item 104 is called the right 103 of the content item 104. The right 103 of a content item 104 may comprise access, rendering, modifying, ownership etc. A content item 104 may e.g. be accessed by a device 200 or rendered at the device 200.

Figure 2:
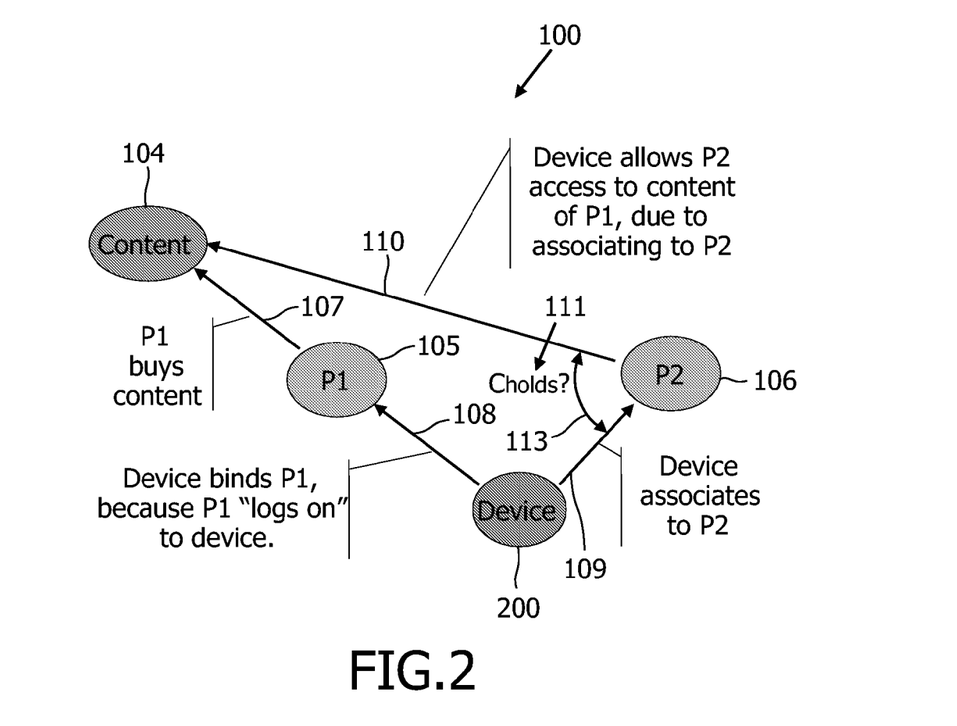
FIG. 2 schematically illustrates the dynamics between the content, the person, and the device 200 and the relations between them.
Figure 3:
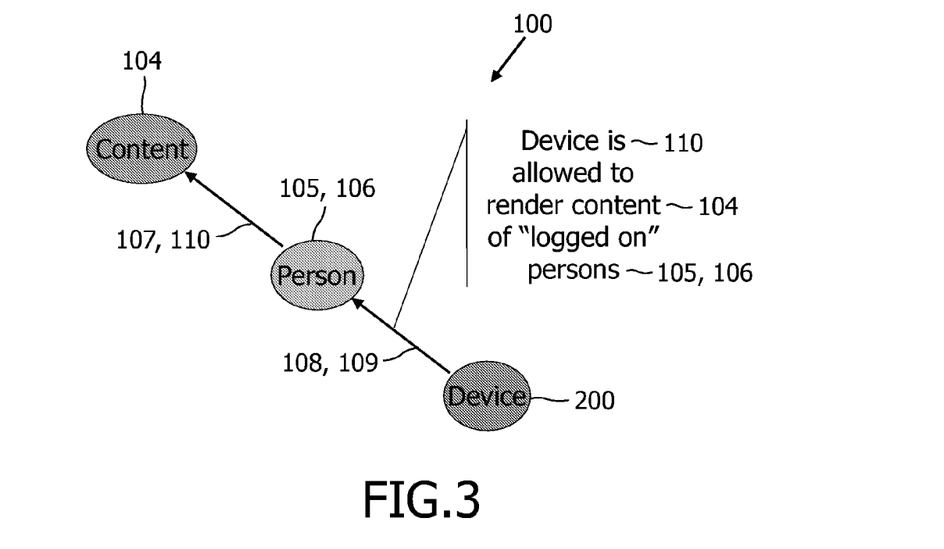
FIG. 3 schematically illustrates an example of a rule for enforcing the authorized domain 102 at the device 200.

As shown in FIGS. 2 and 3, and according to the invention, a device 200 is only allowed to exercise the right 103, e.g. access or render a content item 104 if the content item 104 is related 107 to a person that has e.g. logged-on to the device 200. This ensures that a user must e.g. log-on to a device 200 to be able to e.g. render his content there. Without the user being bound 108, the device 200 has no privilege to render that content. Further, if the device 200 associates 109 to a second person 106, the second person is granted 110 the right 103 to the content item 104 at the device 200.

In order to limit the authorized domain 102 and enforce a boundary, a device 200 may be arranged to only hold, over a period of time, a limited set of person identities. In order to limit the size of the authorized domain 102 spatially, it may be adapted such that a logg-on can only be performed when the person is in the vicinity of the device 200.

Figure 7:
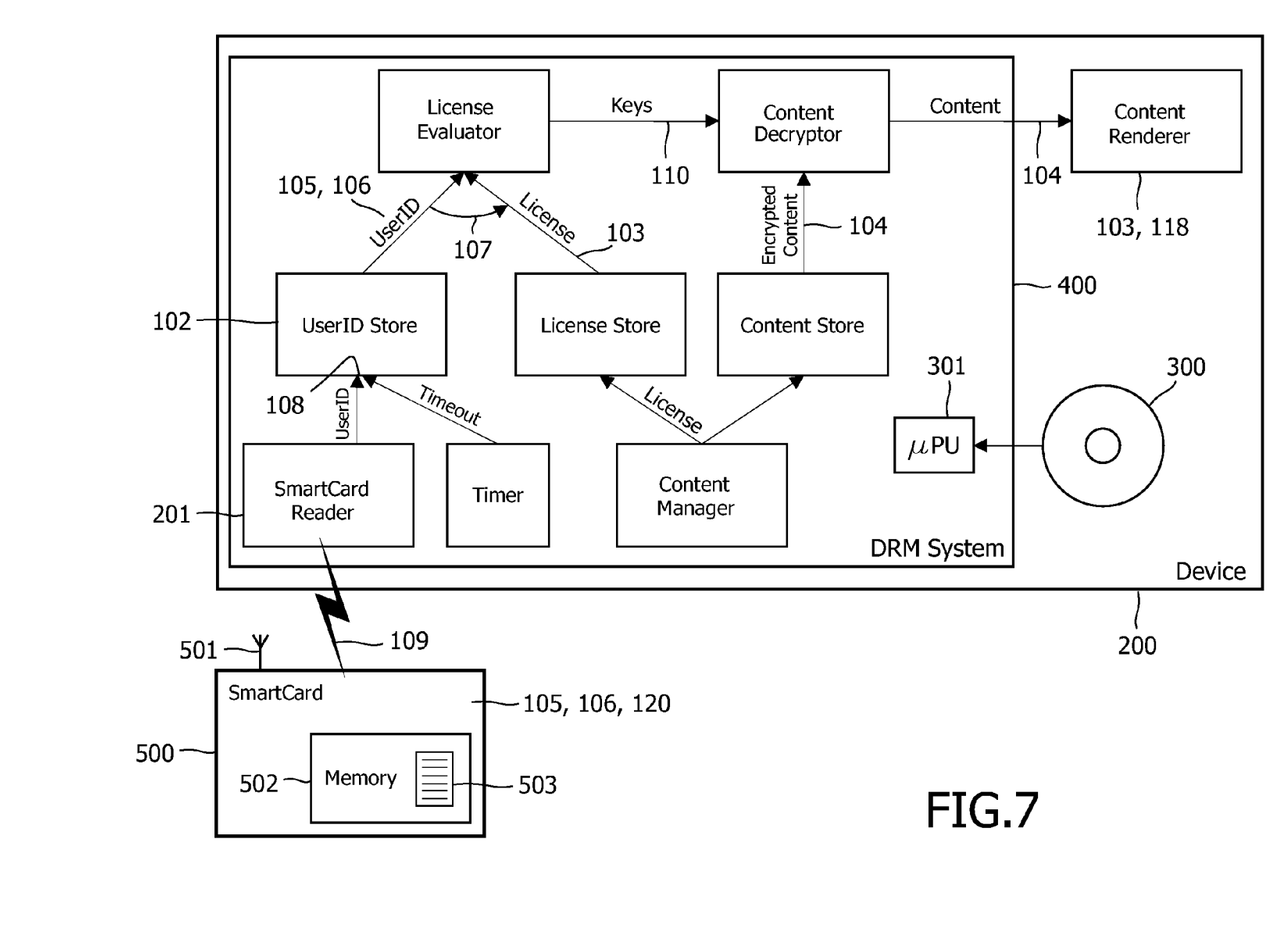
FIG. 7 schematically illustrates an embodiment of the device 200 in accordance with the invention, comprising a smart-card reader.

In a digital rights management system 400 according to the invention, as shown in FIG. 7, authorized domains 102 have the following properties:
1. An authorized domain 102 emerges by means of a user interacting with the device 200.
2. An authorized domain 102 comprises the set of content items available to persons that regularly share a device 200.
3. The authorized domain 102 may be limited in size by a combination of:
   a. expiration of log-ons on the device 200, and
   b. limitation of log-ons per person by means of physical identification.

Advantages of the method 100, the digital rights management system 400 and the authorized domain 102 according to the invention include:
1. There is hardly any user-management necessary. The only management necessary by the user is buying content items and logging-on to devices.

2. It is relatively simple and therefore more comprehensible for users.
3. A user is not restricted to using a limited set of devices or content items.
4. Users that regularly share a device 200, e.g. as in a household, may share content easily. However, sharing a content item 104 with people that do not regularly physically share a device 200, e.g. as typical between Kazaa users, becomes impossible or at least unpractical.
5. An enhanced privacy of the users, because there is no central server that is able to track the use of content items of individual users.
6. The system 400 is relatively simple as it needs to keep track of only a few relations. Additionally, keeping 116 track is distributed over the devices, such that it scales well.
7. Each device 200 needs to hold the identities of only a few persons.
8. Persons are only bound to content items, which in practice may be done using licenses that may be stored by the devices.

The above topics are explained in more detail in the next paragraphs.

Authorized domains 102 emerge by means of user interaction with the device 200. A user may log on to devices 200 that the user has access to. So will other people in the direct surroundings of that user. By sharing devices, people can share content 104. Other people will access the content on the credentials of that user, no content right 103 needs actually to be transferred between people.

Typically these people are close friends that regularly meet, or people within the same household. Similar to the notion of fair use, sharing may be allowed between people that regularly use each others content. If, for example, Joost regularly shares CD's with a friend, he would like to share his online bought content too. By building on natural, existing real-world relations between people, it is expected that people will not feel themselves crippled or restricted in their daily use of digital content. Sharing content between people that have no relation, as e.g. offered by tools like Kazaa, is not possible as these people do not share a device 200.

An authorized domain 102 in accordance with the invention can be looked at from three different viewpoints:
1. From a device 200 point of view, the authorized domain 102 comprises all content items related to the persons that logged on at the device 200, see FIG. 4.
2. From a person point of view, the authorized domain 102 comprises all the content items that are bound to all persons that logged-on to all devices that the person logged on to. This set of content items comprises the content bound to the person, and additionally the content items of others that have logged on to the devices. The latter may differ from device 200 to device 200. The person can e.g. have access to content of others, but only on those devices that the others logged on to, see FIG. 5.
3. From a content point of view, an authorized domain 102 is formed by all the devices that a person, having a right 103 for the content, logged on to.

The only management needed from the user is performing a log-on to devices he wants to use. No explicit domain creation or management is done.

Figure 4:
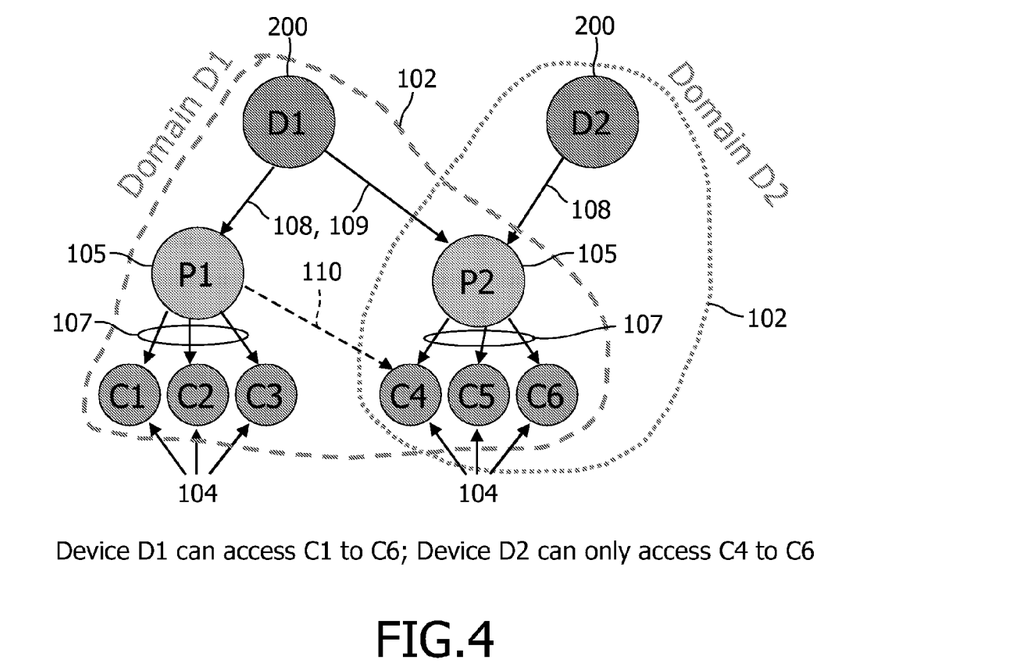
FIG. 4 schematically illustrates an example of two authorized domains from a device 200 point of view, at two devices with two persons and six content items.

The domains depicted in FIG. 4 are domains as seen by the individual devices. D2 has a smaller domain since in only holds the identity of P2, and not P1 as D1 does.

Figure 5:
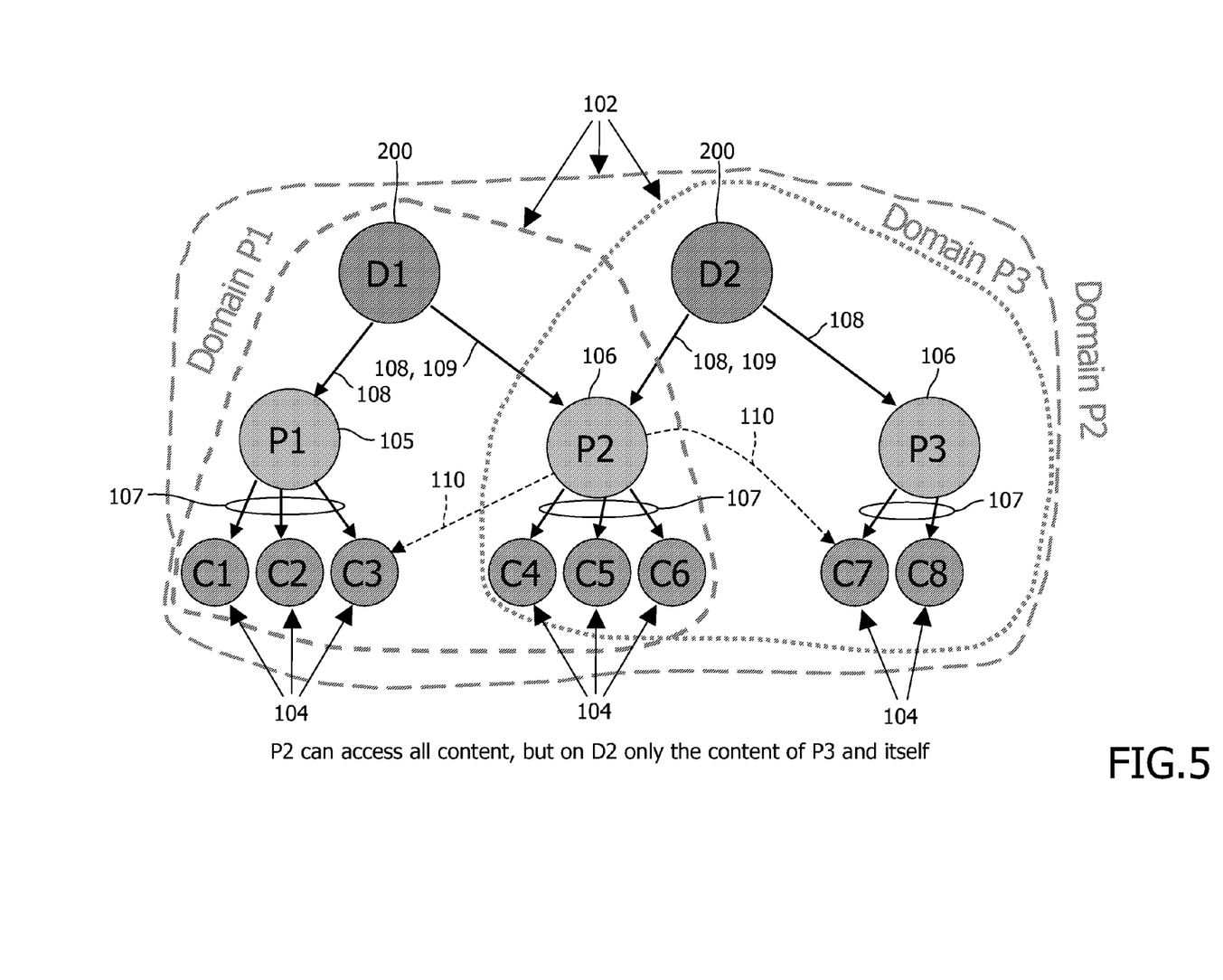
FIG. 5 schematically illustrates an example of three authorized domains from a person point of view, at two devices with three persons and eight content items.

The domains depicted in FIG. 5 are domains as seen by the individual persons. In the example of FIG. 5, person P1 can access the content of itself and P2 on device 200 D1. As he has not logged on to any other device 200 this is all the content he can access.

Person P3 can access the content of itself and P3 on device 200 D2. As he has not logged on to any other device 200 this is all the content he can access.

Person P2 can access all content. However, there is a restriction. Person P1 did not log-on to device 200 D2, and Person P3 did not log-on to device 200 D1. This means that Person P2 can access all his content on both devices, but P1's content only on device 200 D1 and P3's content only on device 200 D2.

The restriction to P2 is valid since P1 and P3 did not share devices.

The example may be put in a real-world scenario as follows. John (P1) and Charles(P3) do not know each other, but have a mutual friend Wim(P2). Furthermore, Charles(P3) owns a TV(D2) and John(P1) owns a radio(D1). John and Charles can not access each others content since they do not know each other. Furthermore, Wim can access his friends' content only on the devices of his friends.

In another scenario, Ariana (P1) and Joost(P2) form a household and share a TV (D1). Joost has a friend, Paul, that he sometimes visits. Paul has a streamium DVD player (D2). Ariana and Joost have access to each others content on the TV. Paul can access Joost's content on his DVD player as Joost has logged-on to that device 200 during one of his visits. However Paul and Ariana have no direct relationship with each other and can not access each others content.

In the system 400 according to the invention, only little administration is to be done. One reason is that the administration information is highly distributed over the devices. Each device 200 may only remember a limited set of identities of persons that logged on for a period of time.

Furthermore, it is not required to enforce a hard maximum to the number of parallel log-ons for a single person. A person may use or own as many devices as he wishes. To prevent 505 authorized domains to grow indefinitely, the device 200 may be arranged such that log-ons expire. Additionally, if it is desired that a physical proximity of a user or a token is required, measures may be taken to ensure that a remote log-on is impossible on the device.

An important facet of an authorized domain 102 system 400 is the limitation of the size of the authorized domain 102. It must not be possible to create an authorized domain 102 that spans the whole world. Three mechanisms limit the size of an authorized domain 102 in accordance with the invention:
1. Rights are always bound to a single person. This removes the possibility that rights are shared by large groups of people. A right may for example be a content license.
2. By limiting 113 the number of log-ons, there is a limit to the amount of people that share devices, and so a limit is created to the possibilities to share content. Log-on limitation may be achieved using two complementary strategies:
   a. by limiting 113 the set of devices a specific person can log on to, and
   b. by limiting 113 the log-ons on each device 200.
   Both strategies are explained below.
3. Log-on expiration provides for a reduction of device 200 sharing. If a person does not log-on to a device 200 for a while, his log-on may expire and his content will no longer be rendered by the device 200. The authorized domain 102 therefore automatically adapts to reflect the 'real-world', where people dynamically engage and end social relations. The system 400 follows by adding and removing sharing possibilities, as users interact with devices. Adding is achieved by people sharing devices. Removing may be achieved by explicit removal triggered by the user, or by expiry, wherein the system 400 is arrange for removing identity information from devices after some time. As a result of expiry, people can no longer share content, when they no longer meet. The time value may be in terms of a couple of minutes, hours, days, or months.

There are various mechanisms to limit the amount of log-ons per device 200:

A user may be offered the possibility for an explicit log-off from a device 200. After log-off the device 200 no longer renders content related to the person that logged-off. This limits the sharing of content items.

A device 200 may be arranged to limit the amount of persons that may be logged-on simultaneously. This may be implemented by limiting 113 the identities a device 200 can hold. The limiting 113 of the amount of identities limits the amount of content available to the device 200 and thus the amount of content shared between people. When the limit of identities is reached and a new log-on is performed, one of the older identities may be removed. This may be implemented by offering the user a choice for selecting the identity to be removed, or by arranging the device 200 to select a person, or by a combination of selection by the user and by the device 200. Options for the device 200 selecting the identity to be removed include: select one at random from the logged-on identities, select the most used, select the oldest, select the newest, select the least used, etc. The effect of selecting the oldest resembles the effect of the measure of log-on expiration. If only the user may select and not the device 200, a less desirable scenario becomes possible in which someone owning a lot of content performs a one time logon that may subsequently be shared forever. Expiration of log-ons may prevent 505 this scenario.

A device 200 may limit the number of logons per time-frame such that a policy is enforced by the device 200. This may prevent 505 large scale abuse, in which users logon and logoff quickly to gain access to virtually any content item 104 in the world.

Not all devices have to adhere to the same limiting 113 strategy. Depending on the nature and situation of a device 200, different strategies may be used. For example, a listening device 200 in a public rail-road station might have a memory or cache for identities with a size of zero, meaning that a log-on expires as soon as you leave, effectively disallowing others to use your content items on that device 200. For a device 200 located in a home, the cache size, being the maximum of concurrently bound persons to the device, may be set relatively large to accommodate for all members of the household.

It is recommendable to have the size of the identity cache large enough to accommodate for most groups. Too small cache sizes may lead to awkward situations in which a household has 6 persons, while a device 200 will only hold 5 log-ons. These situations may be prevented by increasing the identity cache size.

The cache size may be set dynamically and thus be flexible: when many log-ons occur in a small time period, the cache size may grow. Furthermore, the expiration mechanism already removes old log-ons, limiting 113 the amount of log-ons per device 200. This makes that the amount of identities to be held in one device 200 may be quite large, while still effectively limiting 113 the size of the authorized domain 102.

A second way of restricting log-ons is to restrict the person in his choice of devices to log-on to. The amount of log-ons per person may be explicitly fixed, but this may be involved. Another approach is that the size of the authorized domain 102 is limited by the limited mobility of the users. For example, a logon may require a secure authentication of the user's presence or of the presence of a token 500. While this approach does not provide an explicit hard limit of log-ons per person, it provides for a soft or more natural limit. The user is only at one place at a time and the user does not go everywhere, resulting in the fact that the user can only log-on to the limited amount of devices it can visit. Note that this fits also in the limitation per device 200 because this is all about the interaction between the two.

In combination with the expiration mechanism, sharing content on a large scale becomes unpractical for a user in a system 400 based on mobility of the user, since he must go to many devices at different locations to maintain concurrent log-on sessions at the devices. This is sufficient to withhold people from large scale sharing of content. In such system 400, sharing is only practical between people that regularly meet, which are typically close friends, and people within one household.

It is noted that for a device 200 that does not have a means to interface with a token 500 like a smart-card, an authentication protocol over e.g. USB is an alternative, where a host transfers person credentials to the device 200. This is less secure than a token 500, because USB has maximum cable lengths that mimic the prove of physical presence or proximity, but this proof is weak since USB may be tunneled over different media. Such alternative therefore requires special measures. Mass-scale distribution of log-on information is to be prevented, as this ruins the limitation of the authorized domain 102 size. Therefore, log-on information may be stored in tamper-proof tokens like a smart-card, a physically uncloneable function (PUF), or be based on e.g. a biometry of the person.

Figure 6:
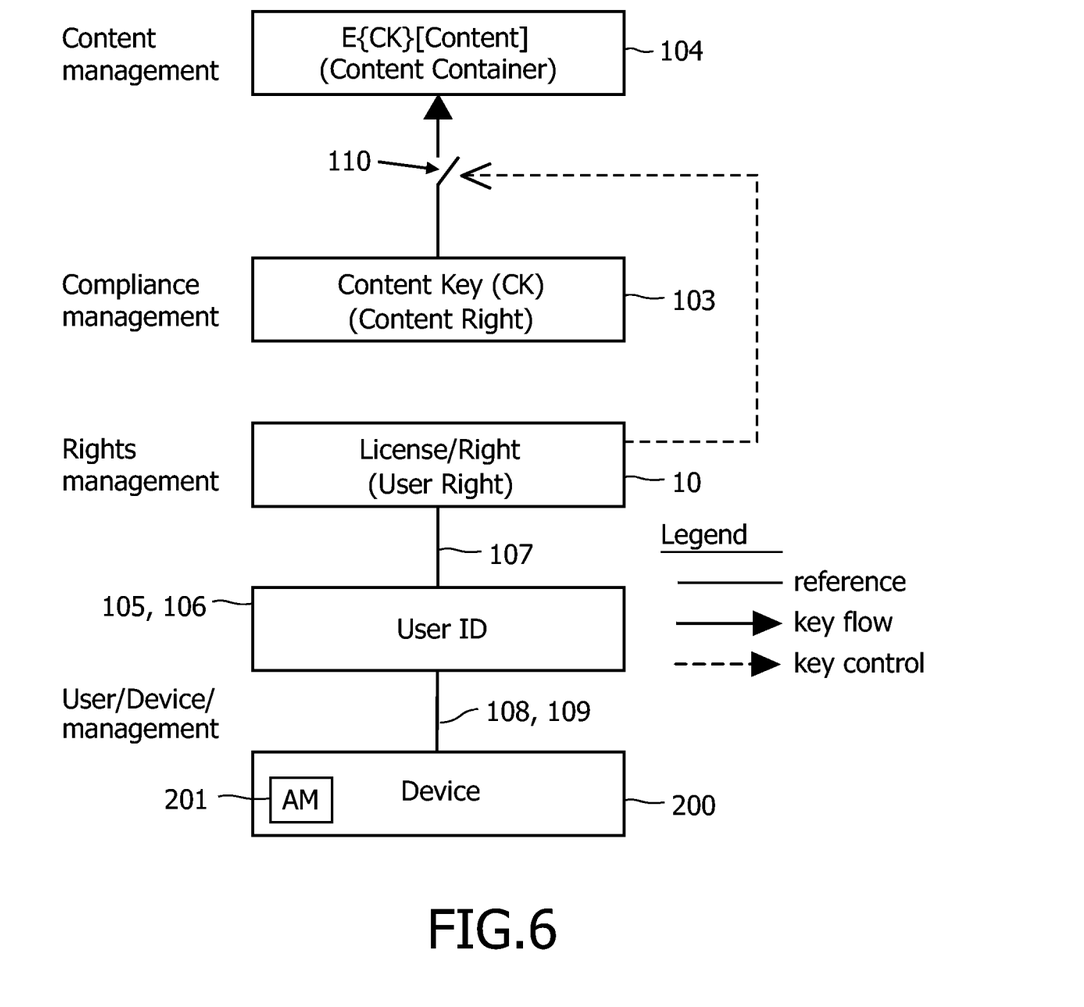
FIG. 6 schematically illustrates an embodiment of the digital rights management system 400 in accordance with the invention, being an adapted authorized domain 102 digital rights management system 400.

In one embodiment a conventional typical authorized domain 102 digital rights management system 400 was adapted, see FIG. 6. The authorized domain 102 system 400 has a special part on domain management, in which persons and devices are explicitly related to each other using two certificates, DomainUsers and DomainDevices. In the adapted system 400, this part is removed and replaced by a part that enables a simple direct relation from device 200 to person.

It is noted that there are many alternative embodiments. In fact many existing digital rights management systems can be used or adapted to implement the notion of a lightweight authorized domain 102.

Compliant devices may keep a list of UserIDs of persons that have proven their physical presence to the device 200. This may be done securely using smart-cards. Each entry in the UserID-list is invalidated by the device 200 after the expiry time. This may be implemented with each entry having a specific validity period, of e.g. one month. After this validity period the UserID is invalidated, for example by removing it from the list. The person may refresh the entry with a later logg-on. A later logg-on may reset the expiry time. Everytime the person loggs on, e.g. by proving his presence, the entry may become valid for one month.

Content and licenses may be obtained or exchanged via the network, for example with UPnP, OMA, etc. This is the role of the content manager in FIG. 7. The model is based on the notion of a compliant or trusted device 200. It is assumed that only a device 200 that enforces at least one of the above policies for size limitation is able to decrypt and render content. A device 200 may therefore have to prove its trustworthiness and compliance to receive licenses or keys. Many protocols are known for trust establishment and device 200 authentication. These protocols may be included in the Content Manager, because trust needs to be established before licenses may be exchanged.

A compliant device 200 may access and/or render all content for which a suitable license exists that relates to at least one of the persons kept in its UserID-list. This may be achieved by matching the UserIDs with the Licenses to check if a license belongs to a person that has logged-on. If the license contains an ID present in the UserID-list, the device 200 may evaluate the license which in this embodiment results in a content-key that can be used to decrypt the related content item 104.

The smartcard in this embodiment contains cryptographic information for authenticating 119 a person, e.g. an identity certificate and a corresponding public/private key pair. The smartcard supports the proper authentication protocols to authenticate the person to the device 200. The smartcard provides security against cloning and leakage of the private key of the person.

One of the benefits is the simplicity of the approach with respect to domain management. Domains are created, removed and changed as a natural consequence of users interacting with the system 400. Explicit domain management is not necessary. Only a small set of userIDs are kept on each device 200. These sets may be created and maintained locally, circumventing many impractical properties of existing solutions.

The lack of centralized management of user information brings the advantage of end-user privacy. Devices do not need to communicate about who logs-in, and who accesses what content when. Moreover, all license processing is done local. No server interaction is needed to verify if a device 200 is allowed to render some content of a person. It is relatively hard to track the activity of a particular person.

It is submitted that the person skilled in the art knows how to apply licenses and processing with the invention.

An advantage of the invention is that it is easily explained to a user, because there are basically four rules when the expiration mechanism is applied:
1. Log on if you want to use your right 103 of the content item 104 on this device 200;
2. You can use rights of content items of other people that logged on recently on this device 200;
3. If you do not want others to use your rights of the content item 104 on a device 200: log-off from that device 200;
4. If you did not use this device 200 for a while, you may need to log-on again.

Sometimes, due to expiration, the user may not use content of someone else anymore. The device 200 may have enough information to present useful feedback at such times. The device 200 could e.g. present the username of the person who should log-on to enable rendering of the content item 104 again.

Figure 8:
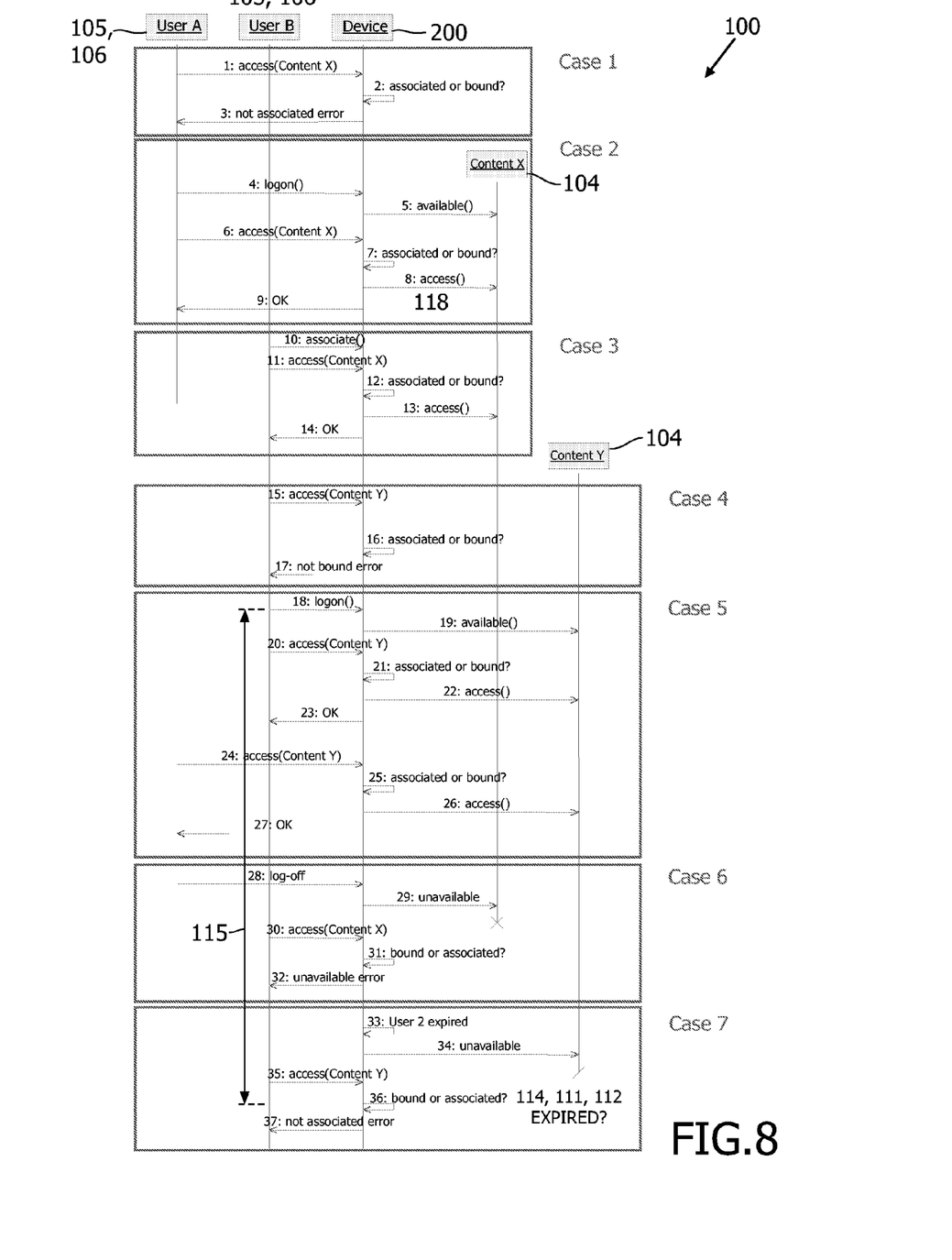
FIG. 8 schematically illustrates some use cases of an embodiment of the method 100 in accordance with the invention.

FIG. 8 shows some use cases that demonstrate the dynamics over time at a device 200. In the figure, time flows from top to bottom. Vertical timelines are drawn for two persons 105, 106 dubbed User A and User B, a Device 200, and two content items 104 labeled Content X and Content Y. A horizontal arrow from an originating timeline to a destination timeline indicates a message transfer, a function call, a transaction, or an event exchanged between the respective entities.

In FIG. 8, it is assumed that Content X 104 is bound 107 to User A 105 and Content Y 104 is bound 107 to User B 105.

Case 1 shows what happens if either of the persons 105, 106 try to access 103 content 104 of a person 105 who has not been bound 108 by the device 200. Firstly, User A 105 tries to access 1 his content without the device 200 being bound 108 to User A 105. Secondly, the device 200 determines 2 User A 105 to be neither bound nor associated to the device 200. Thirdly, the device 200 returns 3 an indication that User A 105 is not allowed to access 103 Content X 104 with a "not associated error" 3.

Case 1 shows this for User A 105, but User B 105, 106 would get the same result when attempting access to Content Y, as well as to Content X.

Case 2 shows that a device 200 being bound 108 to a person 105 (User A) is a state of the device 200 in which his content 104 is available. The access attempt 6 succeeds 9 after the person 105 has logged on 4, the latter causing the device 200 to be bound 108 to the person 105.

Case 3 shows that User B 106 can access 103 the content 104 of User A 105 as well, after associating 10 himself 106. Note that the content 104 of User B 106 is not made available, as User B 106 associated 10 himself with the device 200, and did not bind 18 himself to the device 200 yet.

Case 4 shows User B 106 trying to access 103 his content item 104 (Content Y), being associated 10, but not bound 18 to the device 200. This fails 17.

Case 5 shows User B 105 being bound 108 to the device 200 after using a logon 18. As a result Content Y 104 is made available, and can be accessed 103 by User B 105 as well as User A 105, as both are bound 108 to the device 200.

Case 6 shows the device 200 unbinding a person 105, in response to User A 105 logging off 28. As a result, all content 104 of User A 105 becomes unavailable for all persons, 105, 106 including User A 105. Case 6 shows this by User B 106 trying 30 to access 103 Content X 104, which results in a failure 32.

Case 7 shows expiry 33 of the log-on 18 of User B 105, e.g. by means of a timer. The expiry 33 has the same result as logging off, because all content 104 of User B 105 becomes unavailable for all persons 105, 106. This is shown by the attempt 35 of User B 105 accessing 103 Content Y 104, which results in a failure 37.

Figure 9:
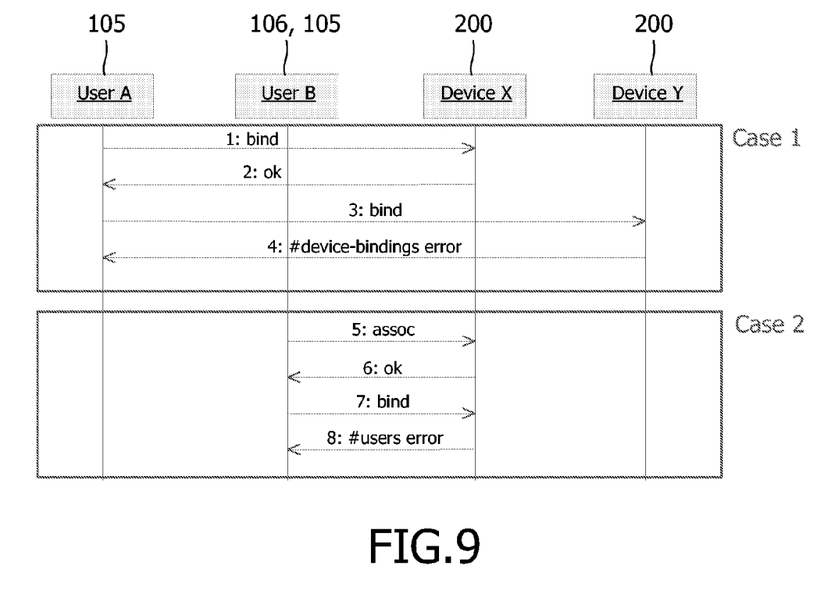
FIG. 9 schematically illustrates two further use cases of an embodiment of the method 100 in accordance with the invention.

FIG. 9 shows two further cases that illustrate an embodiment of the method of claim 8 that uses the criteria that: the device 200 is bound to a number of further persons 121, and the number exceeds a threshold 122; a number of further devices 125 are bound to the first person 105 and the number exceeds a threshold 122; and a number of further devices 125 are associated to the second person 106 and the number exceeds a threshold 122. The condition 112 is determined not to hold if at least one of the criteria evaluated are met.

The threshold 122 may be seen as a limit or a maximum to the number of allowed concurrent bindings.

A precondition for the example of FIG. 9 is that:

Device X 200 has almost reached its maximum of allowed bindings or, in other words, the threshold 122 equals the number of further persons 121 being bound by the device 200.

User A, which may be a first user 105 or a second user 106, has almost reached his limit of allowed bindings or, in other words, the threshold 122 equals the number of further devices that are bound to the person dubbed User A.

Case 8 shows an example of User A binding to Device X, which is OK, but thereby User A reaches his limit, or, in other words, the number of further devices that are bound to the person dubbed User A now exceeds the threshold 122.

As a result and according to this embodiment of the method of the invention, User A is not able to bind to Device Y anymore.

Case 9 continues this example, by assuming that as consequence of the binding of User A in the first case, Device X is on his limit of allowed bindings or, in other words, the number of persons that are bound to the device now exceeds the threshold 122. As a result User B 106 may be allowed to associate, but a binding results in an error, as the threshold of allowed bindings is exceeded at Device X. In another situation, e.g. with a different policy implemented at device X, the association could fail as well due to a limitation of associations by Device X.

Figure 10:
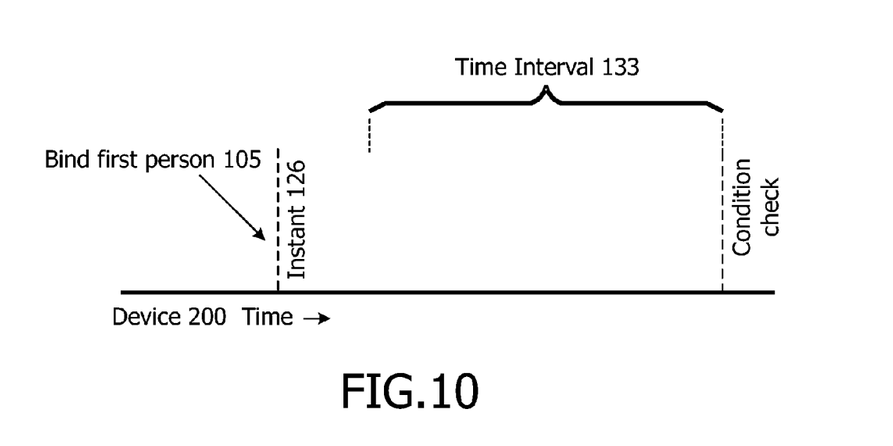
FIGS. 10, 11 and 12 schematically illustrates timing diagrams of an embodiment of the method 100 in accordance with the invention.

FIG. 10 illustrates an embodiment of the method of claim 8 that uses the criteria that the device 200 bound the first person 105 at an instant 126 outside a time interval 133. If the device 200 bound the first person 105 too long ago, the right is not granted, effectively implementing an expiry of bindings.

Figure 11:
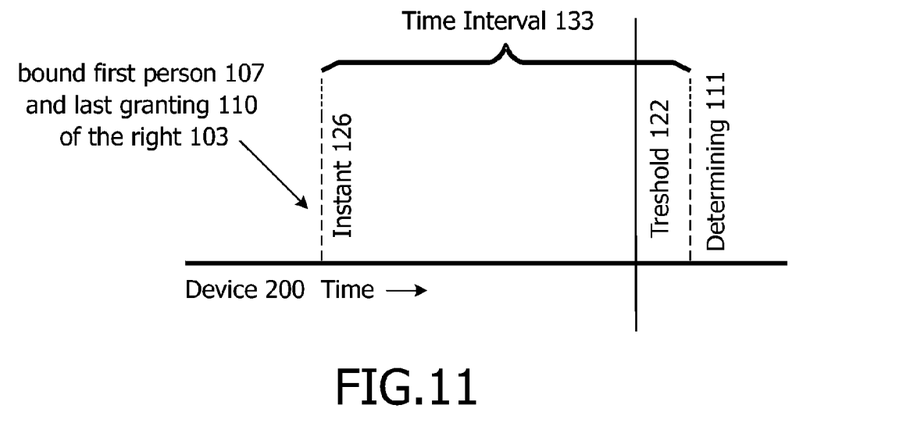

FIG. 11 illustrates an embodiment of the method of claim 8 that uses the criteria that a time interval 133 between the determining 111 and the instant 126 that the device 200 bound the first person 105 exceeds a threshold 122; and that a time interval 133 between the determining 111 and the instant 126 that the device 200 last granted the right 103 is below a threshold 122. If both the instants 126 are within the time interval 133, the right is granted, but if either instant 126 is outside the time interval 133, the right is not granted. This effectively implements expiry of bindings and expiry of grants.

Figure 12:
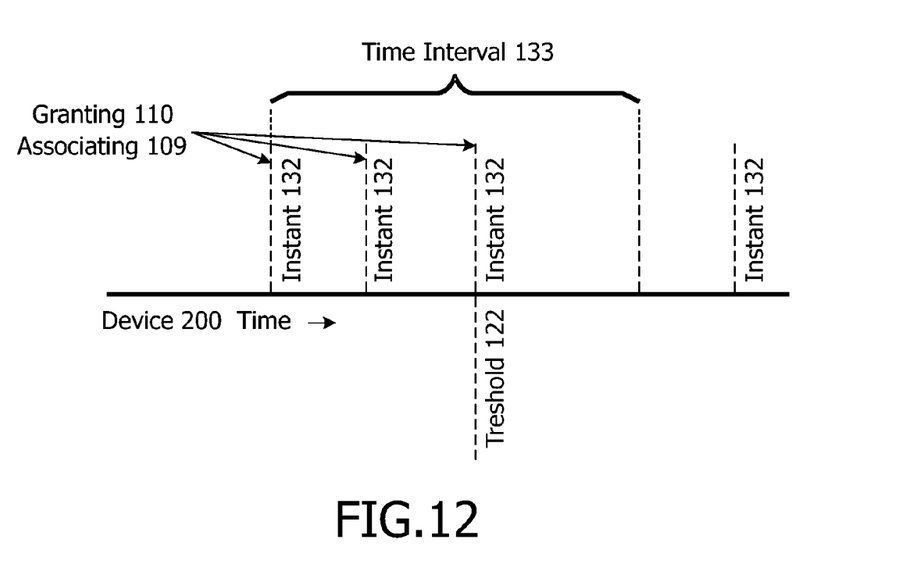

FIG. 12 illustrates an embodiment of the method of claim 8 that uses the criteria that the number of instants 132 of the granting 110 in a time interval 133 exceeds a threshold 122, and that the number of instants 132 of the associating 109 in a time interval 133 exceeds a threshold 122. This effectively implements a limit to the number of grants or associations over time.

Also outside the field of authorized domains 102, it may be useful to apply a method of conditionally accessing 103 a content item 104 on a device 200 by a user A 106 having no access right 103 to the content item 104, whereby user A 106 is allowed 110 to access 103 the content item 104 if a user B 105 has access 103 to the content item 104 and if both user A 106 and user B 105 are logged onto the device 200.

In the claims, any reference signs placed between parentheses shall not be constructed as limiting the claim. The word "comprising" does not exclude the presence of elements or steps other than those listed in a claim. The word "a" or "an" preceding an element does not exclude the presence of a plurality of such elements.

The invention can be implemented by means of hardware comprising several distinct elements, and by means of a suitably programmed computer. In the device claim enumerating several means, several of these means can be embodied by one and the same item of hardware. The mere fact that certain measures are recited in mutually different dependent claims does not indicate that a combination of these measures cannot be used to advantage.

The invention claimed is:

1. A method for creating on a device comprising a digital rights management system, a controlled device environment within which an encrypted content item can be used by number of persons based on a digital content license bound only to a first person, the digital content license enabling the first person to decrypt the encrypted content item using a decryption key and to perform predefined actions on the decrypted content item, the method comprising acts of:

binding the device to the first person by one of authenticating and identifying the first person by the device and the device adding a first identifier of the first person to a user identifier list;

binding the device to a second person by one of identifying and authenticating the second person and adding a second identifier of the second person to the user identifier list provided that the number of persons on the user identifier list is below a predetermined threshold, whereby the second person is added to a controlled device environment on the device, the controlled device environment arranged for enabling a second person to exercise the digital content license on the device, provided that the device is bound to the first person; and in response the device granting the second person to decrypt the encrypted content item using a decryption key associated with the encrypted content item and exercising one of the predefined actions on the decrypted content item based on the digital content license bound only to the first person, provided that the first identifier and the second identifier are in the user identifier list, the granting without requiring the digital rights management system to transfer the digital content license to the second person, such that the second person is not bound to the right and the right is not transferred between the first person and the second person;

the device subject to the granting decrypting the encrypted content item and exercising the one of the predefined actions on the decrypted content item for the second person;

the device unbinding the first person on user request or after a predetermined time interval following the device binding the first person, the unbinding comprising removal of the first identifier from the user identifier list; and the device subject to the unbinding of the first person no longer granting the second person to decrypt the encrypted content item using a decryption key associated with the encrypted content item and to exercise the one of the predefined actions on the decrypted content item based on the digital content license.

2. The method according to claim 1, wherein the digital content license comprises access to the decryption key.

3. The method according to claim 1, further comprising an act of keeping a history of at least one of: the first person having the right; binding of the device to the first person; binding the device to the second person; and exercising one of the predefined actions on the content item by the second person, wherein the granting the second person depends on the history.

4. The method according to claim 1, wherein the predefined actions comprises at least one of storing, accessing, retrieving, decrypting, processing, and rendering.

5. The method according to claim 1, wherein the authenticating comprises at least one of the second person logging on the device, providing an identity, providing a password, using a smart-card, using a token, using Near Field Communication, providing a biometry, providing a proof of physical presence, providing a proof of the second person being physically in the proximity of the device.

6. The method according to claim 1, further comprising an act of generating an authorized domain on the device for sharing a right to the content item between the first person and the second person.

7. The method according to claim 1, wherein a token is used for establishing the relationship between the device and the second person.

8. A device comprising a digital rights management system for creating on a device a controlled device environment within which an encrypted content item can be used by number of persons based on a digital content license bound only to a first person, the digital content license enabling the first person to decrypt the encrypted content item using a decryption key and to perform predefined actions on the decrypted content item, the device comprising:

the device binding the first person to the device by one of authenticating and identifying the first person by the device and the device adding a first identifier of the first person to a user identifier list;

the device binding a second person to the device by one of identifying and authenticating the second person and adding a second identifier of the second person to the user identifier list provided that the number of persons on the user identifier list is below a predetermined threshold, whereby the second person is added to a controlled device environment on the device, the controlled device environment arranged for enabling a second person to exercise the digital content license on the device, provided that the device is bound to the first person;

the device in response granting the second person to decrypt the encrypted content item using a decryption key associated with the encrypted content item and exercising one of the predefined actions on the decrypted content item based on the digital content license bound only to the first person, provided that the first identifier and the second identifier are in the user identifier list, the granting without requiring the digital rights management system to transfer the digital content license to the second person, such that the second person is not bound to the right and the right is not transferred between the first person and the second person;

the device decrypting the encrypted content item and exercising the one of the predefined actions on the decrypted content item for the second person subject to the granting;

the device unbinding the first person on user request or after a predetermined time interval following the device binding the first person, the unbinding comprising removal of the first identifier from the user identifier list; and the device no longer granting the second person to decrypt the encrypted content item using a decryption key associated with the encrypted content item and to exercise the one of the predefined actions on the decrypted content item based on the digital content license subject to the unbinding.

9. A non-transitory computer readable medium storing a series of programmable instructions configured for execution by at least one processor of a device for providing a method for creating on the device comprising a digital rights management system, a controlled device environment within which an encrypted content item can be used by number of persons based on a digital content license bound only to a first person, the digital content license enabling the first person to decrypt the encrypted content item using a decryption key and to perform predefined actions on the decrypted content item, the method performed by the device comprising:

binding the device to the first person by one of authenticating and identifying the first person by the device and the device adding a first identifier of the first person to a user identifier list;

binding the device to a second person by one of identifying and authenticating the second person and adding a second identifier of the second person to the user identifier list provided that the number of persons on the user identifier list is below a predetermined threshold, whereby the second person is added to a controlled device environment on the device, the controlled device environment arranged for enabling a second person to exercise the digital content license on the device, provided that the device is bound to the first person; and in response the device granting the second person to decrypt the encrypted content item using a decryption key associated with the encrypted content item and exercising one of the predefined actions on the decrypted content item based on the digital content license bound only to the first person, provided that the first identifier and the second identifier are in the user identifier list, the granting without requiring the digital rights management system to transfer the digital content license to the second person, such that the second person is not bound to the right and the right is not transferred between the first person and the second person;

the device subject to the granting decrypting the encrypted content item and exercising the one of the predefined actions on the decrypted content item for the second person;

the device unbinding the first person on user request or after a predetermined time interval following the device binding the first person, the unbinding comprising removal of the first identifier from the user identifier list; and the device subject to the unbinding of the first person no longer granting the second person to decrypt the encrypted content item using a decryption key associated with the encrypted content item and to exercise the one of the predefined actions on the decrypted content item based on the digital content license.

* * * * *